United States Patent
Shimano et al.

(10) Patent No.: US 7,139,473 B2
(45) Date of Patent: Nov. 21, 2006

(54) FOLDING TYPE CAMERA DEVICE AND FOLDING TYPE PORTABLE TELEPHONE

(75) Inventors: Kiyoharu Shimano, Sakai (JP); Masayuki Ehiro, Izumi (JP); Yoshinori Tanida, Tenri (JP); Katsuitsu Nishida, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 35 days.

(21) Appl. No.: 10/789,363

(22) Filed: Feb. 26, 2004

(65) Prior Publication Data

US 2004/0183935 A1    Sep. 23, 2004

(30) Foreign Application Priority Data

Feb. 27, 2003    (JP)    ............... 2003-050679

(51) Int. Cl.
G03B 29/00    (2006.01)
H04M 1/00    (2006.01)
H04N 7/14    (2006.01)
H04N 9/09    (2006.01)

(52) U.S. Cl. .................. 396/73; 396/429; 455/575.3; 348/14.02; 348/262; 348/375

(58) Field of Classification Search ............ 396/73–75, 396/429; 348/14.02, 262, 335, 360, 374, 348/375; 455/575.3
See application file for complete search history.

(56) References Cited

U.S. PATENT DOCUMENTS

| | | | |
|---|---|---|---|
| 6,643,457 B1 * | 11/2003 | Chen ........................ | 396/74 |
| 2002/0067924 A1 | 6/2002 | Yamazaki et al. ......... | 396/429 |
| 2002/0077145 A1 | 6/2002 | Kamiya et al. ............ | 455/550 |
| 2003/0040346 A1 | 2/2003 | Fukuda et al. ............. | 455/575 |
| 2003/0137595 A1 * | 7/2003 | Takachi ..................... | 348/340 |
| 2003/0174240 A1 | 9/2003 | Wada et al. ................ | 348/374 |
| 2004/0048633 A1 * | 3/2004 | Sato et al. ................. | 455/556.1 |

FOREIGN PATENT DOCUMENTS

| | | |
|---|---|---|
| JP | 2002-111834 | 4/2002 |
| JP | 2002-185589 | 6/2002 |
| JP | 2002-271665 | 9/2002 |
| JP | 2002-354082 | 12/2002 |
| JP | 2002-374434 | 12/2002 |

OTHER PUBLICATIONS

European Search Report mailed Jun. 7, 2004, for corresponding application No. 04251081.8-2202 (4 pgs.).
IBM Corp., "Camera Lens Changing Mechanism," IBM Technical Disclosure Bulletin, vol. 36, No. 12, Dec. 1993, pp. 511-514.

* cited by examiner

Primary Examiner—W. B. Perkey
(74) Attorney, Agent, or Firm—David G. Conlin; Edwards Angell Palmer & Dodge LLP

(57) ABSTRACT

There are provided a first casing 100A that has a photosensor section 113 for capturing an image, a second casing 100B that has a lens section 122 for projecting the image of a subject onto the photosensor section 113 of the first casing 100A and a connection section 100C that foldably connects the first casing 100A with the second casing 100B. The photosensor section 113 and the lens section 122 are arranged so that the photosensor section 113 and the lens section 122 are superposed on each other in a state in which the first casing 100A and the second casing 100B are folded together. With this arrangement, the folding type camera device and the folding type portable telephone equipped with this device can be reduced in thickness.

19 Claims, 9 Drawing Sheets

FOLDING TYPE CAMERA DEVICE AND FOLDING TYPE PORTABLE TELEPHONE

This Nonprovisional application claims priority under 35 U.S.C. §119(a) on Patent Application No. P2003-050679 filed in Japan on (Feb. 27, 2003), the entire contents of which are hereby incorporated by reference.

BACKGROUND OF THE INVENTION

The present invention relates to a folding type camera device and a folding type portable telephone provided with a camera function.

In a prior art folding type portable telephone provided with a camera function, a camera unit is built in either one of a first casing located on the display side and a second casing located on the operation panel side of the folding type portable telephone since the camera unit in which a lens section and a photosensor section are integrally formed is easy to handle.

As shown in FIGS. 8A through 8E, there is a folding type portable telephone in which a main body side casing A and an LCD side casing B are integrally constructed by being pivotably connected with each other via a pivot section C, and a camera unit D is built in only the second casing A located on the operation panel side as a prior art folding type camera unit (e.g., JP 2002-11834 A).

Moreover, as shown in FIG. 9, there is a folding type portable telephone in which a display section 10A and an operation section 10B are pivotably connected with each other via a hinge unit 21, and a camera unit 25 is built in only the display section 10A as a prior art folding type camera unit (e.g., JP 2002-185589 A).

However, the folding type portable telephone shown in FIGS. 8A through 8E and FIG. 9, in which the thickness of the casing equipped with the camera unit D is determined by a focal distance (about 4 mm) between the lens and the photosensor section, has therefore a problem that it cannot cope with a demand for further reducing the thickness of the folding type portable telephone. Moreover, the folding type portable telephone, which has an integrally formed camera unit mechanism, also has a problem that the lens cannot be replaced according to normal photographing, telephotographing, close-up photographing and so on.

SUMMARY OF THE INVENTION

Accordingly, an object of this invention is to provide a folding type camera device and a folding type portable telephone capable of coping with a further reduction in thickness.

Another object of this invention is to provide a folding type camera device and a folding type portable telephone capable of coping with the replacement of the lens in accordance with various demands of photographing such as close-up photographing and telephotographing in the above-mentioned folding type camera device and folding type portable telephone.

In order to achieve the above object, there is provided a folding type camera device comprising:

a first casing having a photosensor section for capturing an image;

second casing having a lens section for projecting the image of a subject on the photosensor section of the first casing; and a connection section for pivotably connecting the first casing with the second casing and allowing the mutually connected first casing and second casing to be folded together.

According to the folding type camera device of the above-mentioned construction, the lens section and the photosensor section of the mounted camera unit can be separated into the first casing located on the display side and the second casing located on the operation panel side, so that the thickness can be reduced in comparison with that of the folding type camera device of the prior art folding type portable telephone equipped with the camera unit in which the lens section and the photosensor section are integrated with each other. This arrangement can cope with a further reduction in thickness. It is to be noted that the combination of the lens section and the photosensor section is not limited to one combination, and a plurality of combinations may be provided.

In one embodiment of the present invention, the photosensor section and the lens section are superposed on each other so that the image of the subject is projected on the photosensor section via the lens section in a state in which the first casing and the second casing, which are connected with each other by the connection section, are folded together.

According to the folding type camera device of the above-mentioned embodiment, the photosensor section and the lens section are combined with each other by folding up the first casing and the second casing, which are connected with each other by the connection section, and function as a camera unit to allow an image to be captured.

In one embodiment of the present invention, optical axes of the lens section and the photosensor section, which are superposed on each other in the folded state, roughly coincide with each other.

According to the folding type camera device of the above-mentioned embodiment, by making the optical axes of the lens section and the photosensor section, which function as a camera unit, roughly coincide with each other, a focused image can be captured.

In one embodiment of the present invention, the lens section has a lens and a lens attaching and detaching means for allowing the lens to be attached and detached.

According to the folding type camera device of the above-mentioned embodiment, the lens of the lens section can solely be replaced at need. By using a variety of lenses in addition to the conventional standard lens, the camera device can cope with various demands of photographing such as close-up photographing and telephotographing.

In one embodiment of the present invention, a plurality of the lens sections are provided, and a lens selecting means for selecting one or two or more of the plurality of lens sections is provided.

According to the folding type camera device of the above-mentioned embodiment, the optical characteristics can be changed by selecting one or two or more of the plurality of lens sections at need. By using a variety of lenses in addition to the conventional standard lens, the camera device can cope with various demands of photographing such as close-up photographing and telephotographing.

Also, there is provided a folding type portable telephone having a first casing located on a display side and a second casing located on an operation panel side, the casings being foldably connected with each other, wherein either one of the first casing and the second casing has a photosensor section for capturing an image, and a lens section for projecting an image of a subject on the photosensor section is provided for the other one of the first casing and the second casing.

According to the folding type portable telephone of the above-mentioned construction, the lens section and the photosensor section of the mounted camera unit can be separated into the first casing located on the display side and the second casing located on the operation panel side, so that the thickness can be reduced in comparison with that of the prior art folding type portable telephone equipped with the camera unit in which the lens section and the photosensor section are integrated with each other. This arrangement can cope with a further reduction in thickness. It is to be noted that the combination of the lens section and the photosensor section is not limited to one combination, and a plurality of combinations may be provided.

In one embodiment of the present invention, the photosensor section is provided for the first casing, and the lens section is provided for the second casing.

According to the folding type portable telephone of the above-mentioned embodiment, the photosensor section is provided for the first casing located on the display side, and the lens section is provided for the second casing located on the operation panel side. Therefore, by putting the first casing and the second casing into the folded state (the state in which the telephone is folded up when not used as a portable telephone) so that the display screen side of the first casing and the operation panel side of the second casing face each other, it becomes possible to take a photograph with the lens section facing outwardly of the side opposite from the operation panel side of the second casing. On the other hand, by putting the first casing and the second casing into the reversely folded state so that the side opposite from the display screen side of the first casing and the side opposite from the operation panel side of the second casing face each other, it becomes possible to take a photograph with the lens section facing outwardly of the operation panel side of the second casing.

In one embodiment of the present invention, the photosensor section and lens section are superposed on each other so that the image of the subject is projected on the photosensor section via the lens section in a state in which the first casing and the second casing are folded so that a side opposite from a display screen side of the first casing and a side opposite from an operation panel side of the second casing face each other.

In the state in which the first casing and the second casing are folded together (the state in which the telephone is folded up when not used as a portable telephone) so that the display screen side of the first casing and the operation panel side of the second casing face each other, the telephone is closed so that, for example, the display screen of the LCD display does not damage. In contrast to this, according to the folding type portable telephone of the above-mentioned embodiment, by putting the first casing and the second casing into the reversely folded state so that the side opposite from the display screen side of the first casing and the side opposite from the operation panel side of the second casing face each other, it becomes possible to expose the display screen to the front side only when the camera is used and easily confirm the image of the subject to be photographed on the display screen.

In one embodiment of the present invention, optical axes of the lens section and the photosensor section, which are superposed on each other in the folded state, roughly coincide with each other.

According to the folding type portable telephone of the above-mentioned embodiment, by making the optical axes of the lens section and the photosensor section, which function as a camera unit, roughly coincide with each other, a focused image can be captured.

In one embodiment of the present invention, the lens section has a lens and a lens attaching and detaching means for allowing the lens to be attached and detached.

According to the folding type portable telephone of the above-mentioned embodiment, the lens of the lens section can solely be replaced at need. By using a variety of lenses in addition to the conventional standard lens, there can be obtained the effect that the camera device can cope with various demands of photographing such as close-up photographing and telephotographing.

In one embodiment of the present invention, a plurality of the lens sections are provided, and a lens selecting means for selecting one or two or more of the plurality of lens sections is provided.

According to the folding type portable telephone of the above-mentioned embodiment, by using a variety of lenses in addition to the conventional standard lens through selecting one or two or more of the plurality of lens sections at need, there can be obtained the effect that the camera device can cope with various demands of photographing such as close-up photographing and telephotographing.

In one embodiment of the present invention, the photosensor section and the lens section are superposed on each other so that the image of the subject is projected on the photosensor section via the lens section in a state in which the first casing and the second casing are folded together so that a display screen side of the first casing and an operation panel side of the second casing face each other.

According to the folding type portable telephone of the above-mentioned embodiment, the subject can be photographed by the photosensor section and the lens section that are superposed on each other in the state in which the first casing and the second casing are folded together (the state in which the telephone is folded up when not used as a portable telephone) so that the display screen side of the first casing and the operation panel side of the second casing face each other. Furthermore, because of the folded state, the position of the hand that is holding the main body and the position of the camera come closer to each other than in the conventional obtusely-angled open state, so that blurring at the time of photographing can be reduced. By compacting the main body at the time of photographing, the photographing operation can be performed even with one hand.

In one embodiment of the present invention, the camera device further comprises a sub-display section which is provided on a side opposite from a light-receiving side of the photosensor section of the first casing or the second casing, the casing having the photosensor section, and displays at least the image of the subject captured by the photosensor section.

According to the folding type portable telephone of the above-mentioned embodiment, even in the state in which the first casing and the second casing are folded together so that the display screen side of the first casing and the operation panel side of the second casing face each other, the image of the subject to be photographed can be confirmed by the sub-display section.

Also, there is provided a folding type portable telephone having a first casing located on a display side and a second casing located on an operation panel side, the casings being foldably connected with each other, wherein either one of the first casing and the second casing has a first photosensor section for capturing an image, the other one of the first casing and the second casing has a second photosensor section for capturing an image, either one of the first casing and the second casing has a second lens section for projecting an image of a subject on the second photosensor section, and the other one of the first casing and the second casing has a first lens section for projecting an image of a subject on the first photosensor section.

According to the folding type portable telephone of the above-mentioned construction, the lens section and the photosensor section of the mounted camera unit can be separated into the first casing located on the display side and the second casing located on the operation panel side, so that the thickness can be reduced in comparison with that of the prior art folding type portable telephone equipped with the camera unit in which the lens section and the photosensor section are integrated with each other. This arrangement can cope with a further reduction in thickness. Moreover, there is the effect that the portable telephone can be reduced in thickness while being equipped with the camera directed in two different directions.

In one embodiment of the present invention, the first photosensor section and the first lens section are superposed on each other so that the image of the subject is projected on the first photosensor section via the first lens section while the second photosensor section and the second lens section are superposed on each other so that the image of the subject is projected on the second photosensor section via the second lens section in a state in which the first casing and the second casing are folded together so that a side opposite from a display screen side of the first casing and a side opposite from an operation panel side of the second casing face each other.

According to the folding type portable telephone of the above-mentioned embodiment, by folding up the first casing and the second casing, which are connected with each other by the connection section, the first photosensor section and the first lens section are combined with each other to function as a camera unit, while the second photosensor section and the second lens section are combined with each other to function as a camera unit. Therefore, the images of the subjects in two different directions can be captured.

In one embodiment of the present invention, optical axes of the first lens section and the first photosensor section, which are superposed on each other in the folded state, roughly coincide with each other, and optical axes of the second lens section and the second photosensor section, which are superposed on each other in the folded state, roughly coincide with each other.

According to the folding type portable telephone of the above-mentioned embodiment, by making the optical axes of the first lens section and the first photosensor section, which function as a camera unit, roughly coincide with each other and making the optical axes of the second lens section and the second photosensor section, which function as a camera unit, roughly coincide with each other, a focused image can be captured.

In one embodiment of the present invention, the first lens section has a first lens and a first lens attaching and detaching means for allowing the first lens to be attached and detached, and the second lens section has a second lens and a second lens attaching and detaching means for allowing the second lens to be attached and detached.

According to the folding type portable telephone of the above-mentioned embodiment, the lenses of the first lens section and the second lens section can solely be replaced at need. By using a variety of lenses in addition to the conventional standard lens, there can be obtained the effect that the camera device can cope with various demands of photographing such as close-up photographing and telephotographing.

In one embodiment of the present invention, the first photosensor section and the first lens section are superposed on each other so that the image of the subject is projected on the first photosensor section via the first lens section while the second photosensor section and the second lens section are superposed on each other so that the image of the subject is projected on the second photosensor section via the second lens section in a state in which the first casing and the second casing are folded together so that a display screen side of the first casing and an operation panel side of the second casing face each other.

According to the folding type portable telephone of the above-mentioned embodiment, the subject can be photographed by the first photosensor section and the first lens section that are superposed on each other and the second photosensor section and the second lens section that are superposed on each other in the state in which the first casing and the second casing are folded together (the state in which the telephone is folded up when not used as a portable telephone) so that the display screen side of the first casing and the operation panel side of the second casing face each other. Furthermore, because of the folded state, the position of the hand that is holding the main body and the position of the camera come closer to each other than in the conventional obtusely-angled open state, so that blurring at the time of photographing can be reduced. By compacting the main body at the time of the photographing, the photographing operation can be performed even with one hand.

In one embodiment of the present invention, the portable telephone further comprises a sub-display section which is provided on a side opposite from a light-receiving surface of the casing of the first photosensor section or the second photosensor section and displays at least the image of the subject to be captured by the first photosensor section or the second photosensor section.

According to the folding type portable telephone of the above-mentioned embodiment, even in the state in which the first casing and the second casing are folded together so that the display screen side of the first casing and the operation panel side of the second casing face each other, the image of the subject to be photographed can be confirmed by the sub-display section.

In one embodiment of the present invention, optical axes of the first lens section and the first photosensor section, which are superposed on each other in the folded state, roughly coincide with each other, and optical axes of the second lens section and the second photosensor section, which are superposed on each other in the folded state, roughly coincide with each other.

According to the folding type portable telephone of the above-mentioned embodiment, by making the optical axes of the first lens section and the first photosensor section, which function as a camera unit, roughly coincide with each other and making the optical axes of the second lens section and the second photosensor section, which function as a camera unit, roughly coincide with each other, a focused image can be captured.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
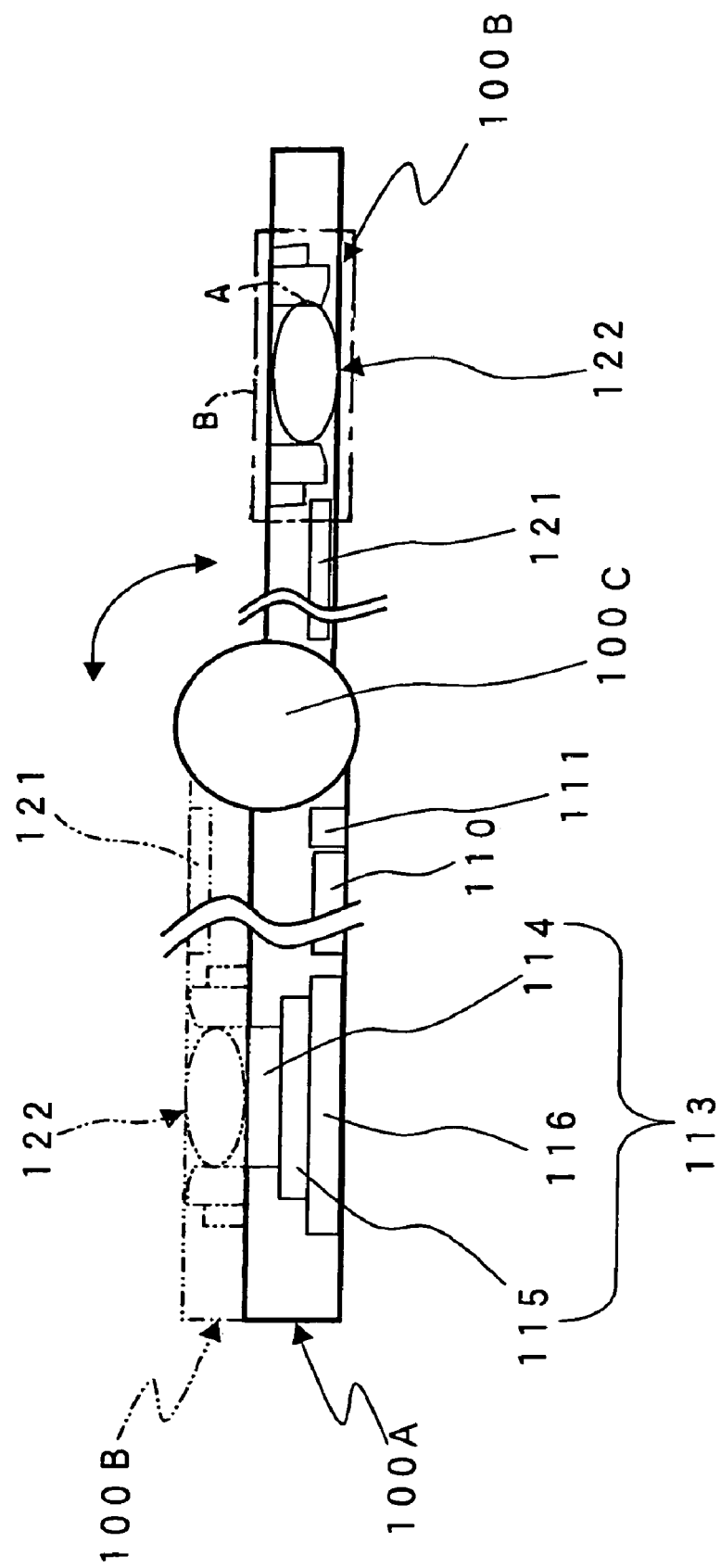
FIG. 1 is a side sectional view of a folding type portable telephone according to a first embodiment of this invention in a state in which the telephone is opened and closed (at the time of photographing)

The folding type camera device and the folding type portable telephone of this invention will be described in detail below with reference to the embodiments shown in the drawings.

(First Embodiment)

FIG. 1 is a side sectional view of a folding type portable telephone that employs a folding type camera device according to the first embodiment of this invention in a state in which the telephone is opened and closed (at the time of photographing).

As shown in FIG. 1, this folding type portable telephone is provided with a first casing 100A that has a display function, a second casing 100B that has an operation function and a connection section 100C that pivotably connects the first casing 100A with the second casing 100B. The first casing 100A and the second casing 100B are pivotably foldably connected with each other via a hinge unit (not shown) of the connection section 100C.

Moreover, a display section 110 that employs an LCD, an organic EL device or the like is arranged on the front surface side of the first casing 100A, and a photosensor section 113 that constitutes part of a camera unit is arranged on the upper side (on the side opposite from the connection section 100C) of the display screen of the display section 110. This photosensor section 113 has a photosensor section 114 and an image data processing device 115 and functions as the camera unit by being integrated with a lens section 122 described later.

The photosensor device 114 receives light emitted from a subject to be photographed via the lens section 122 and converts the light into an electrical signal. The image data processing device 115 is the device for processing the captured image data into image data for display, image data for storage, image data for enlargement and so on.

On the other hand, a portable telephone operation section 121 is arranged on the front surface (operation panel) side of the second casing 100B. A key sheet and an operation section board, which are not shown, are mounted in the portable telephone operation section 121. Moreover, the lens section 122 is arranged in the second casing 100B. By exposing at least part of the lens surfaces of the lens section 122 to the front surface side and the back surface side of the second casing section 100B, light can be transmitted. The second casing 100B may have a housing section (not shown) for removably housing a battery.

Figure 2:
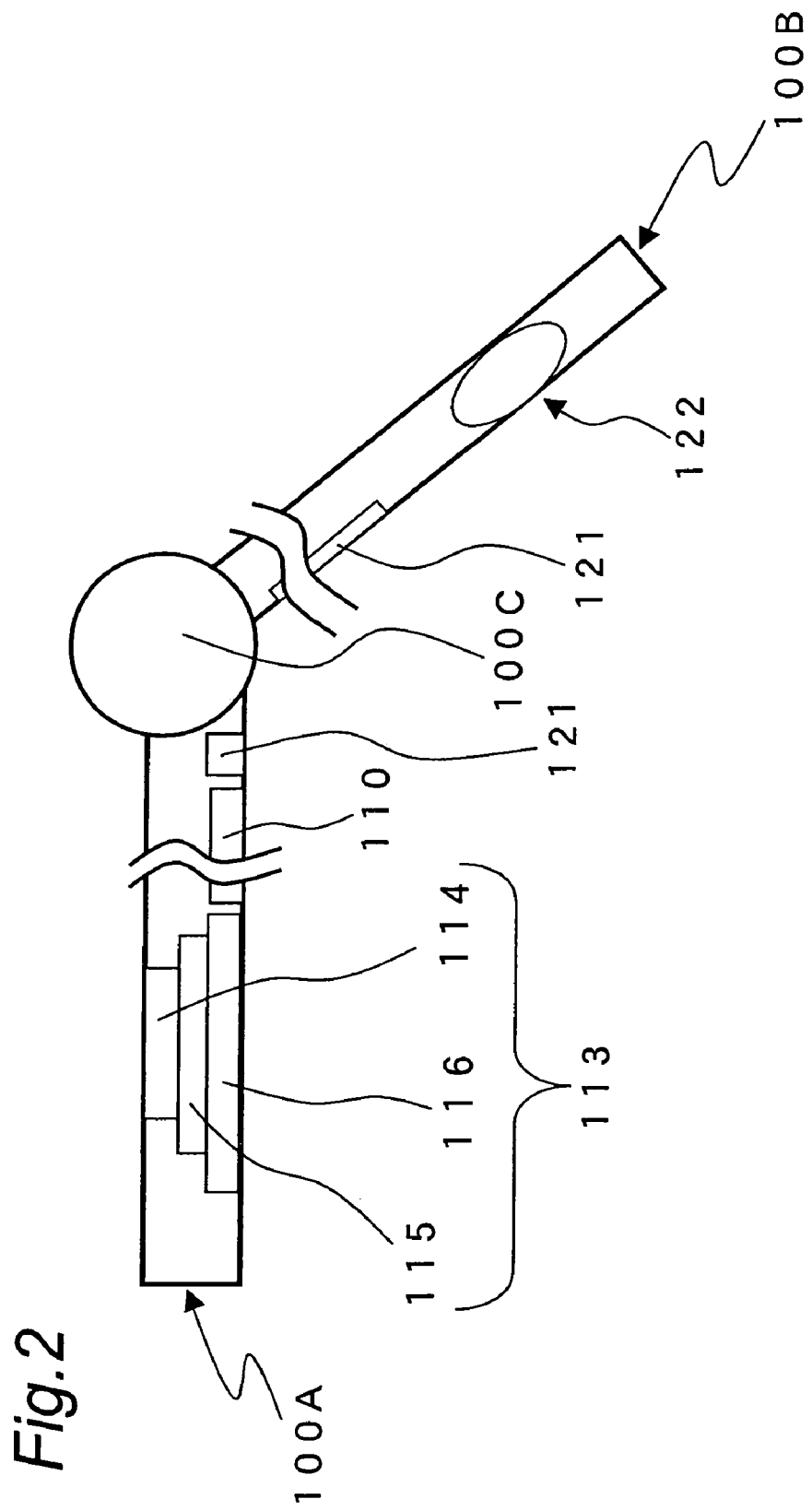
FIG. 2 is a side sectional view in a state in which the above folding type portable telephone is opened (at the time of telephone conversation)

In this case, a state in which the telephone is bent so that the front surface side (display screen side provided with the display section 110) of the first casing 100A and the front surface side (operation panel side provided with the portable telephone operation section 121) of the second casing 100B face each other is assumed to be a forwardly bent state (see FIG. 2).

Moreover, a state in which the telephone is folded so that the back surface side (opposite from the surface provided with the display section 110) of the first casing 100A and the back surface side (opposite from the surface provided with the portable telephone operation section 121) of the second casing 100B face each other is assumed to be a reversely folded state (see FIG. 1).

Use modes of the folding type portable telephone of this first embodiment will be described next.

When the folding type portable telephone is used as a telephone, at least one of the first casing 100A and the second casing 100B is bent obtusely in a dogleg-like profile configuration (see FIG. 2) by being pivoted via the connection section 100C in a direction in which the display section 100 and the portable telephone operation section 121 face each other. Then, the display contents of the display section 110 are to be confirmed while manipulating the portable telephone operation section 121 in hand.

When the folding type portable telephone is used as a camera, at least one of the first casing 100A and the second casing 100B is folded together (folded together in the reverse direction) by being pivoted via the connection section 100C until the back surface of the first casing 100A and the back surface of the second casing 100B come in contact with each other so that the display section 100 side and the portable telephone operation section 121 side, which are located inside the obtusely-angled or dogleg-like profile configuration, face outward. By arranging the photosensor section 114 and the lens section 122 so that the photosensor section 114 and the lens section 122 are superposed on each other in this folded state, an image can be captured by the photosensor section 114 and the lens section 122 that are combined as the camera unit. The photosensor section 114 and the lens section 122 should preferably be arranged so that the respective optical axes coincide with each other. With this arrangement, a focused image can be captured.

In the reversely folded state, the camera is to be held so that the lens section 122 is directed to the subject and the display section 110 is positioned on this side. In the case where the image of the subject displayed in the display section 110 is the desired image, the camera operation section 111 provided on the back surface side of the first casing 100A is manipulated to capture the image. Then, the image data captured by the photosensor section 114 and the lens section 122 is stored in a nonvolatile memory section (not shown) provided in the folding type portable telephone.

Figure 8:
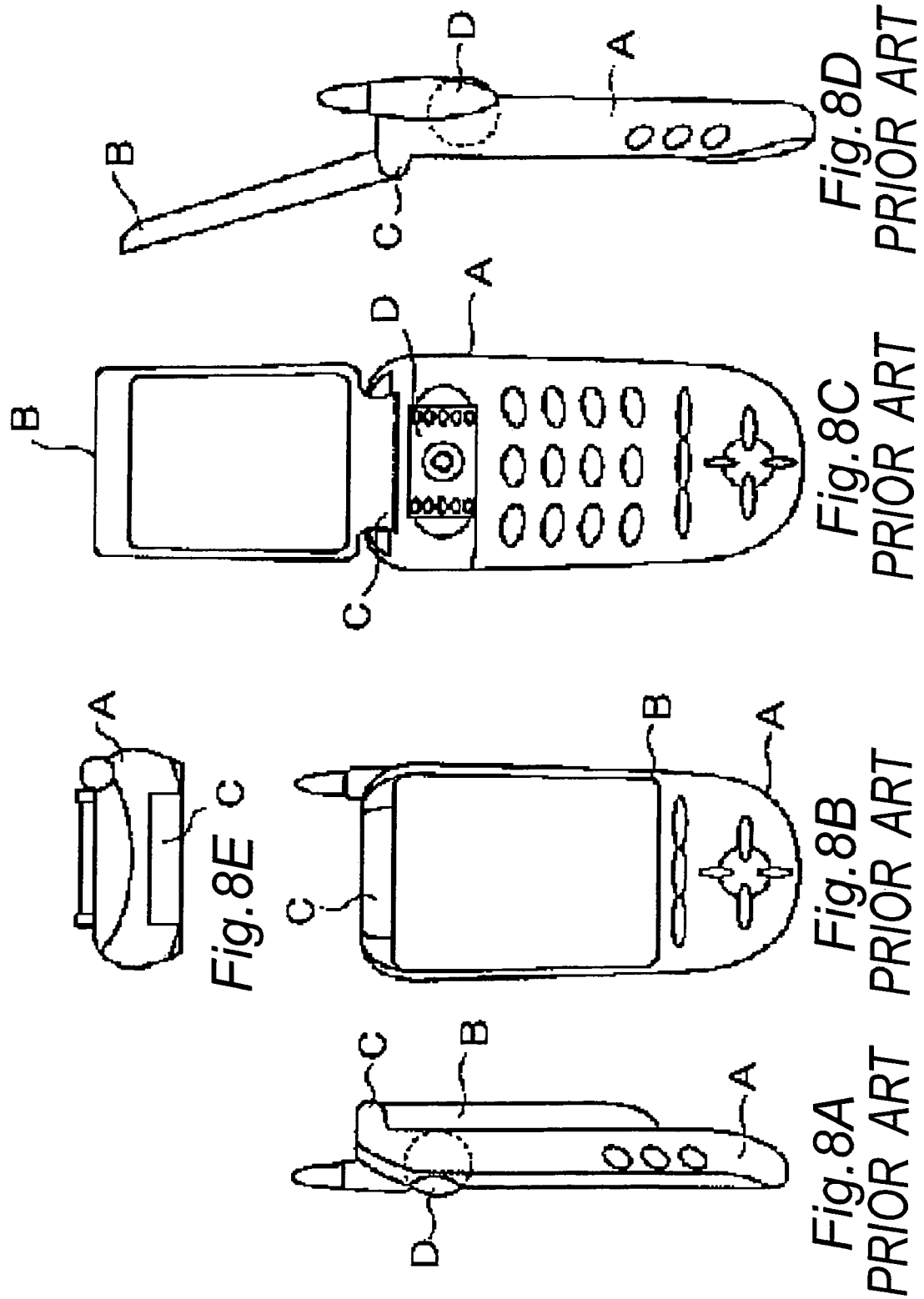
FIGS. 8A through 8E are exterior views of a prior art folding type portable telephone.
Figure 9:
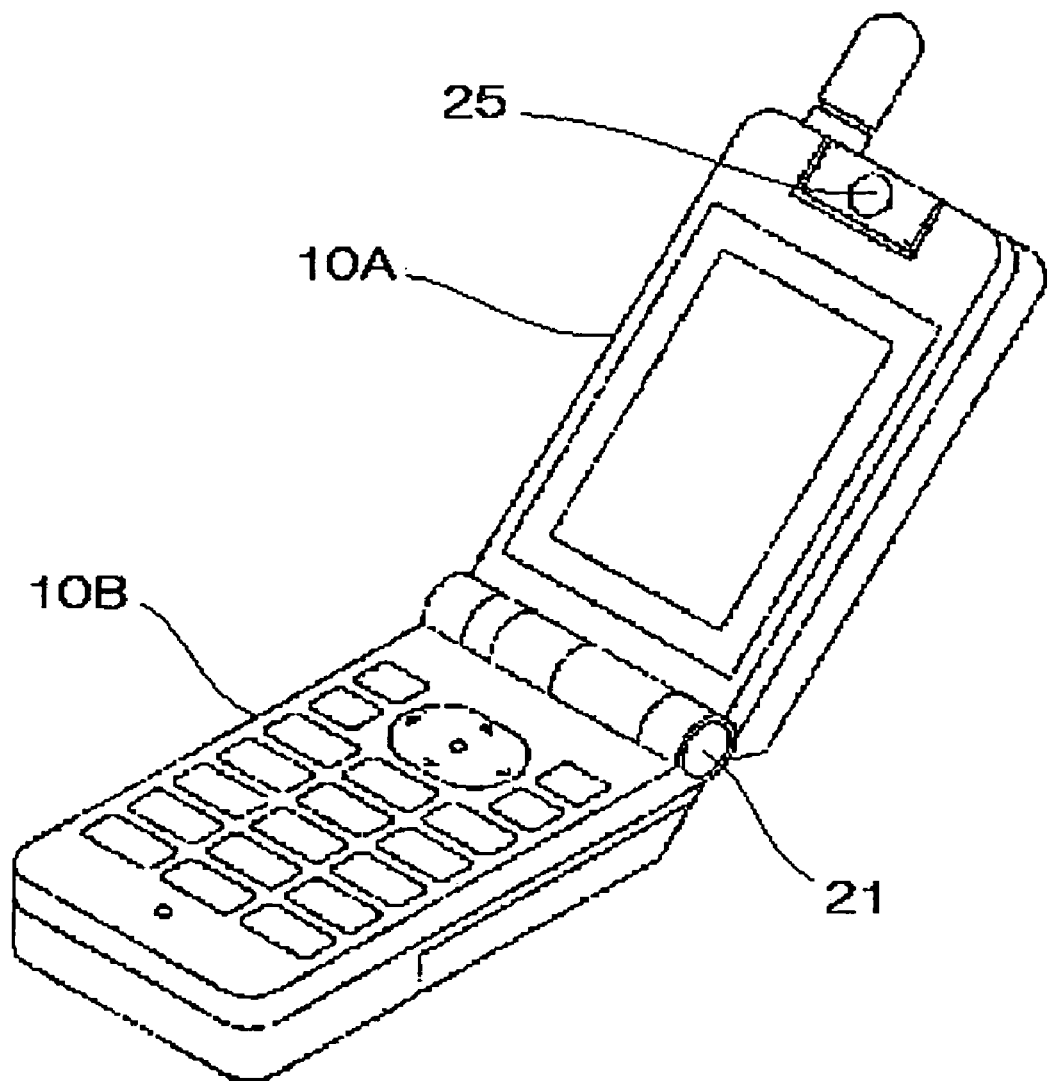
FIG. 9 is a perspective exterior view of another prior art folding type portable telephone.

The lens section 122 has the structure housed in the second casing 100B, and the thickness of the lens section 122 is smaller than the original thickness of the second casing 100B. Therefore, the thickness of the lens section 122 falls within the thickness of the second casing 100B. Therefore, the thickness of the second casing 100B located on the operation panel side can be reduced in comparison with the prior art folding type portable telephone shown in FIG. 8. Moreover, the thickness of the first casing 100A located on the display side can be reduced in comparison with that of the prior art folding type portable telephone shown in FIG. 9. In short, this first embodiment has an effect that the folding type portable telephone can be further reduced in thickness.

Moreover, by putting the first casing 100A and the second casing 100B into a reversely folded state so that the side opposite from the display screen side of the first casing 100A and the side opposite from the operation panel side of the second casing 100B face each other, it becomes possible to easily confirm the image of the subject to be photographed on the display screen of the display section 110 during the use of the camera.

Moreover, it is also possible to provide, for example, a mechanism constituting a pair of threads A for the lens section 122 and the second casing 100B as one example of lens attaching and detaching means for allowing the lens section 122 to be easily attached to and detached from the second casing 100B. Otherwise, it is also possible to provide a mechanism capable of changing the camera performance by sliding only the lens section selected from a plurality of lens sections B as one example of lens selecting means. In this case, it is possible to provide lenses for various applications of photographing such as telephotographing and close-up photographing, and therefore, the range of photographing can be expanded.

Moreover, although the telephone has conventionally been required to be used as a camera in the obtusely-angled or bent state, the telephone of this invention can be used as a camera in the folded state. As a result, the position of the hand that is holding the main body and the position of the camera come closer to each other than in the conventional obtusely-angled dogleg-like open state, so that blurring at the time of photographing can be reduced. Furthermore, because of the folded state, further compacting than in the conventional case can be achieved, and the photographing operation can be performed even with one hand.

Although the camera operation section 111 is provided on the lower side of the display screen in this first embodiment, it is acceptable to utilize a touch-panel type switch on the surface of the display section 110 as a camera operation section. In this case, there is an effect that the parts count can be reduced and the operation panel surface is smoothed.

Furthermore, it is acceptable to provide the camera operation section 111 at a lower side end portion (on the side surface in the vicinity of the connection section 100C) of the first casing 100A. In this case, photographing with one hand becomes easier.

Moreover, the photosensor section 113 is arranged so that the optical axis thereof roughly coincides with that of the lens section 122 in the reversely folded state, where the photosensor section 113 and the lens section 122 constitute the camera unit.

It is to be noted that the photosensor section 113 is constituted by providing the photosensor device 114 and the image data processing device 115 on a mounting board 116 in this first embodiment. However, the folding type portable telephone can be further reduced in thickness in the case where the photosensor device and the image data processing device are integrated into one chip in the form of a CMOS image sensor or in the case where the photosensor device and the image data processing device are integrated into one device by a chip stack technology.

FIG. 2 is a side sectional view in a state in which the folding type portable telephone of this first embodiment is opened (at the time of telephone conversation). It is to be noted that the photosensor section and the lens section of the folding type portable telephone of this embodiment are arranged in positions that avoid the center portion of the casing, causing no obstruction to the telephone conversation operation of the folding type portable telephone.

Figure 3:
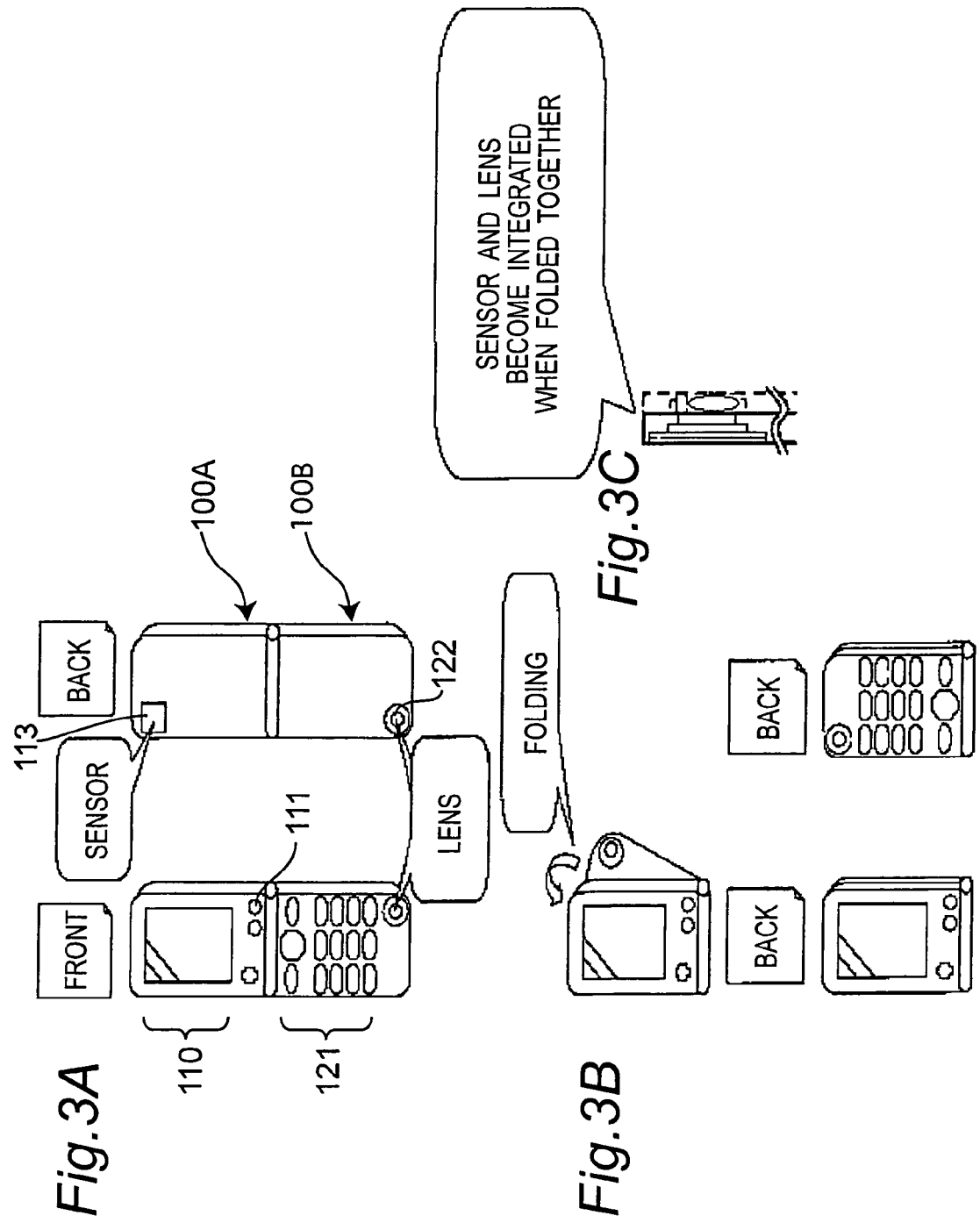
FIGS. 3A through 3C are external perspective views schematically showing the above folding type portable telephone.

FIG. 3A is an external perspective view schematically showing the folding type portable telephone of this first embodiment in the open state in which the camera unit is not used. An antenna (not shown) is provided in the vicinity of the left-hand end (on the upper left side of the front surface in FIG. 3A) of the end surface of the first casing 100A on the upper side of the display screen of the display section 110. The camera operation section 111 for shutter operation, operation mode setting and so on is provided in the vicinity of the left-hand end of the casing end surface on the lower side of the display screen of the display section 110.

FIG. 3B is an external perspective view schematically showing the folding type portable telephone of this first embodiment in the closed state in which the camera unit is used. FIG. 3C is a sectional view of the camera unit section of the folding type portable telephone in the closed state shown in FIG. 3B.

(Second Embodiment)

Figure 4:
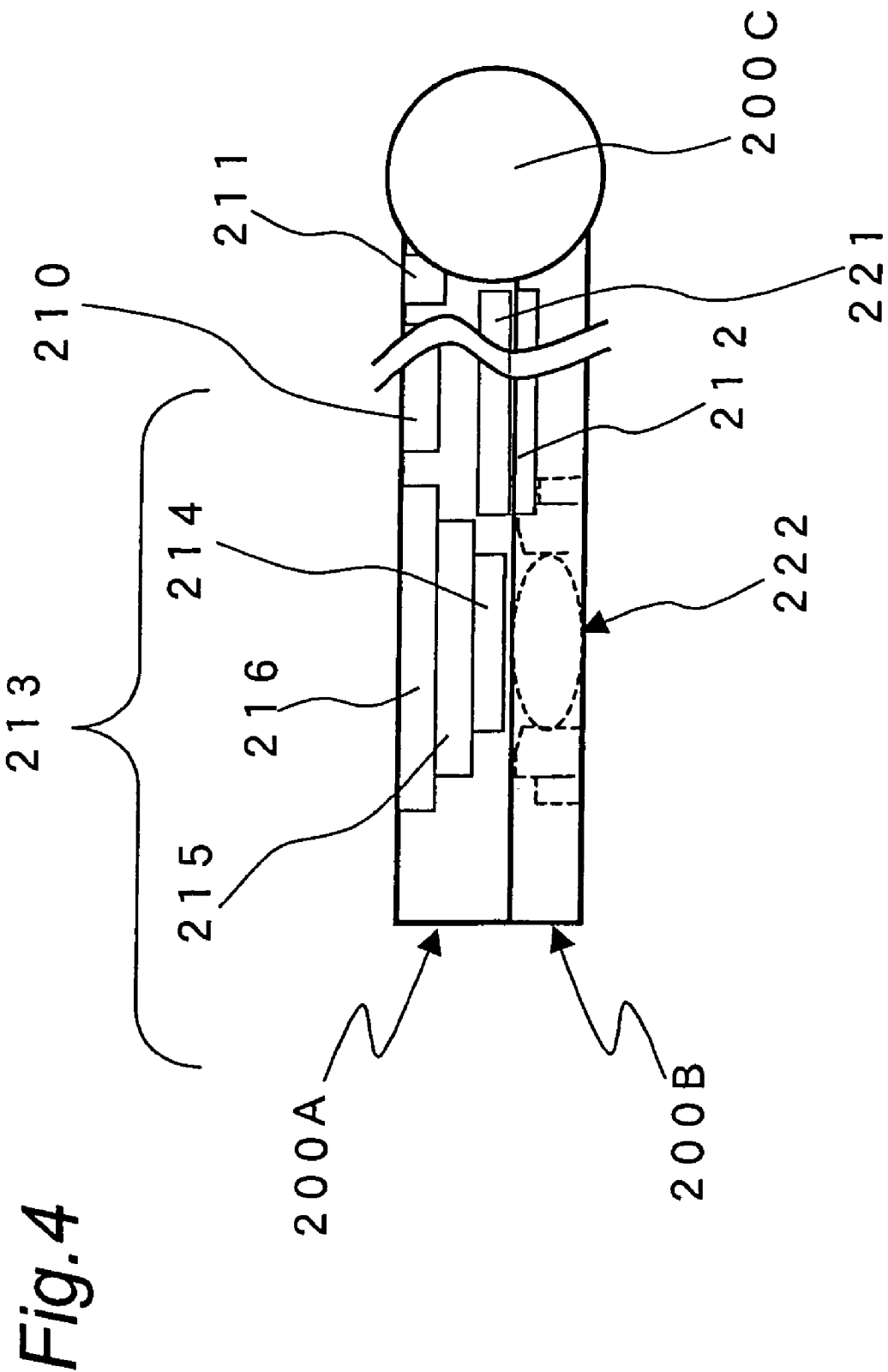
FIG. 4 is a side sectional view of a folding type portable telephone according to a second embodiment of this invention in a state in which the telephone is closed (at the time of photographing)

FIG. 4 is a side sectional view of a folding type portable telephone that employs the folding type camera device of the second embodiment of this invention in a state in which the telephone is closed (at the time of photographing). The closed state means a state in which the telephone is folded up in the forward direction with the main LCD and the keypad located inside when it is not used as a telephone.

This folding type portable telephone is provided with a first casing 200A that has an operation function, a second casing 200B that has a display function and a connection section 200C that pivotably connects the first casing 200A with the second casing 200B. The first casing 200A is pivotably connected with the second casing 200B via a hinge unit (not shown) provided for the connection section 200C.

Moreover, a sub-display section 210, which employs an LCD (sub-LCD), an organic EL or the like, and a camera operation section 211 are arranged on the front surface side of the first casing 200A, and a portable telephone operation section 221 is arranged on the back surface side of the first casing 200A. An optical sensor section 213 that constitutes part of the camera unit is arranged on the upper side (the side opposite from the connection section 200C) of the display screen of the sub-display section 210. The photosensor section 213 is provided with a photosensor section 214 and an image data processing device 215 mounted on a mounting board 216 and functions as a camera unit by being integrated with a lens section 222. The camera operation section 211 for performing shutter operation, operation mode setting and so on is arranged on the lower side (in the vicinity of the connection section 200C) of the display screen of the sub-display section 210.

The photosensor section 214 receives light emitted from the subject via the lens section 222 and converts the light into an electrical signal. Moreover, the image data processing device 215 is the device for processing the captured image data into image data for display, image data for storage, image data for enlargement and so on.

Moreover, the lens section 222 is arranged inside the second casing 200B, and the main display section 212 is arranged on the back surface side of the second casing 200B. By exposing at least part of the lens surfaces of the lens section 222 to the front surface side and the back surface side of the second casing section 200B, light can be transmitted. Moreover, since light other than the light from the lens section 222 must be prevented from entering into the photosensor section 213, the first casing 200A and the second casing 200B are required to be completely closed.

Use modes of the folding type portable telephone of this second embodiment will be described next.

Figure 5:
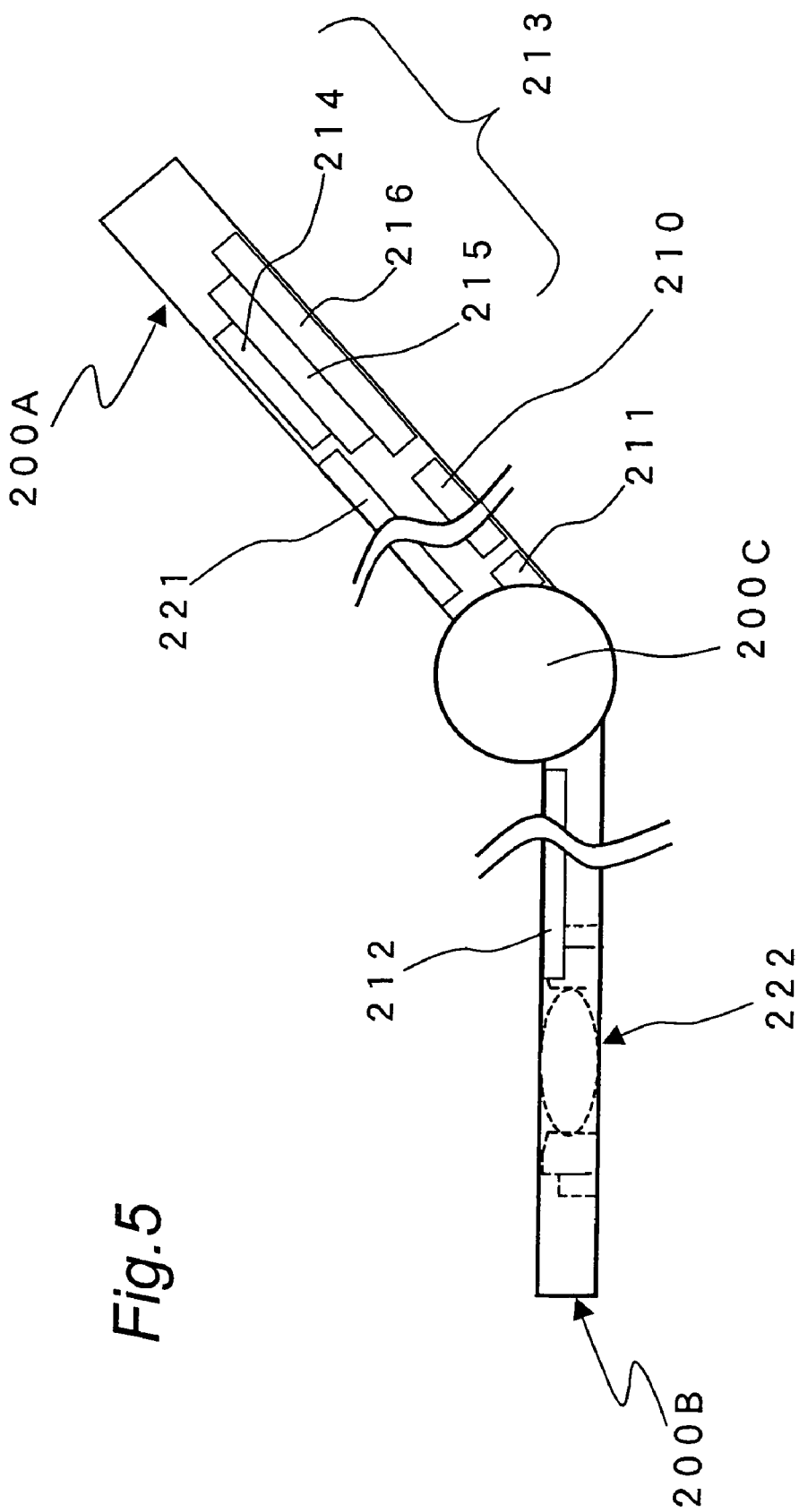
FIG. 5 is a side sectional view in a state in which the above folding type portable telephone is opened (at the time of telephone conversation)

When the folding type portable telephone is used as a telephone, as shown in FIG. 5, at least one of the first casing 200A and the second casing 200B is obtusely bent in a dogleg-like profile configuration (bent in the forward direction) by being pivoted via the connection section 200C in a direction in which the main display section 212 side of the second casing 200B and the portable telephone operation section 221 side of the first casing 200A face each other. Then, the display contents of the display section 212 are to be confirmed while manipulating the portable telephone operation section 221 in hand.

When the folding type portable telephone is used as a camera, as shown in FIG. 4, the body is completely folded together (completely folded together in the forward direction) so that the main display section 212 of the second casing 200B and the portable telephone operation section 221 of the first casing 200A face each other, and the body is held so that the lens section 222 is directed to the subject and the sub-display section 210 is positioned on this side. In the case where the image of the subject displayed in the display section 210 is the desired image, the camera operation section 211 provided on the back surface side of the first casing 200A is manipulated to capture the image. Then, the thus-captured image is stored in a nonvolatile memory section (not shown) provided in the folding type portable telephone.

The lens section 222 has the structure to be housed in the second casing 200B, and the thickness of the lens section 222 is smaller than the original thickness of the second casing 200B. Therefore, the thickness of the lens section 222 falls within the thickness of the second casing 200B. Therefore, the thickness of the second casing 200B located on the display side can be reduced in comparison with the prior art folding type portable telephone shown in FIG. 9. Moreover, the first casing 200A located on the operation panel side can be further reduced in thickness in comparison with that of the prior art folding type portable telephone shown in FIG. 8. In short, there is an effect that the folding type portable telephone can be further reduced in thickness.

Moreover, it is also possible to provide, for example, a mechanism constituting a pair of threads for the lens section 222 and the second casing 200B as one example of the lens attaching and detaching means for allowing the lens section 222 to be easily attached to and detached from the second casing 200B. Otherwise, it is also possible to provide the second casing 200B with a mechanism capable of changing the camera performance by sliding only the lens section selected from a plurality of lens sections as one example of the lens selecting means. In this case, it is possible to provide lenses for various applications of photographing such as telephotographing and close-up photographing, and therefore, the range of photographing can be expanded.

Moreover, although the camera has conventionally been required to be used as a camera in the obtusely-angled or bent state, the telephone of this invention can be used as a camera in the folded state (unused state). As a result, the position of the hand that is holding the main body and the position of the camera come closer to each other than in the conventional obtusely-angled dogleg-like open state, so that blurring at the time of photographing can be reduced. Furthermore, because of the folded state, further compacting than in the conventional case can be achieved, and the photographing operation can be performed even with one hand.

Although the camera operation section 211 is provided on the lower side of the display screen in this second embodiment, it is acceptable to utilize a touch panel type switch on the surface of the sub-display section 210 as a camera operation section. In this case, there is an effect that the parts count can be reduced and the operation panel is smoothed.

Furthermore, it is acceptable to provide the camera operation section 211 at a lower side end portion (on the side surface in the vicinity of the connection section 200C) of the first casing 200A. In this case, photographing with one hand becomes easier.

Moreover, the photosensor section 213 is arranged so that the optical axis thereof roughly coincides with the lens section 222 in the forwardly folded state, where the photosensor section 213 and the lens section 222 constitute the camera unit. By thus combining the photosensor section with the lens section and making the respective optical axes coincide with each other, a focused image can be captured.

Moreover, even when the first casing 200A and the second casing 200B are folded together so that the display screen side of the first casing 200A and the operation panel side of the second casing 200B face each other, the image of the subject to be photographed can be confirmed by the sub-display section 210.

It is to be noted that the photosensor section 213 is constituted by providing the photosensor section 214 and the image data processing device 215 on the mounting board 216 in this second embodiment. However, the folding type portable telephone can be further reduced in thickness in the case where the photosensor device and the image data processing device are integrated into one chip in the form of a CMOS image sensor or in the case where the photosensor device and the image data processing device are integrated into one device by the chip stack technology.

(Third Embodiment)

Figure 6:
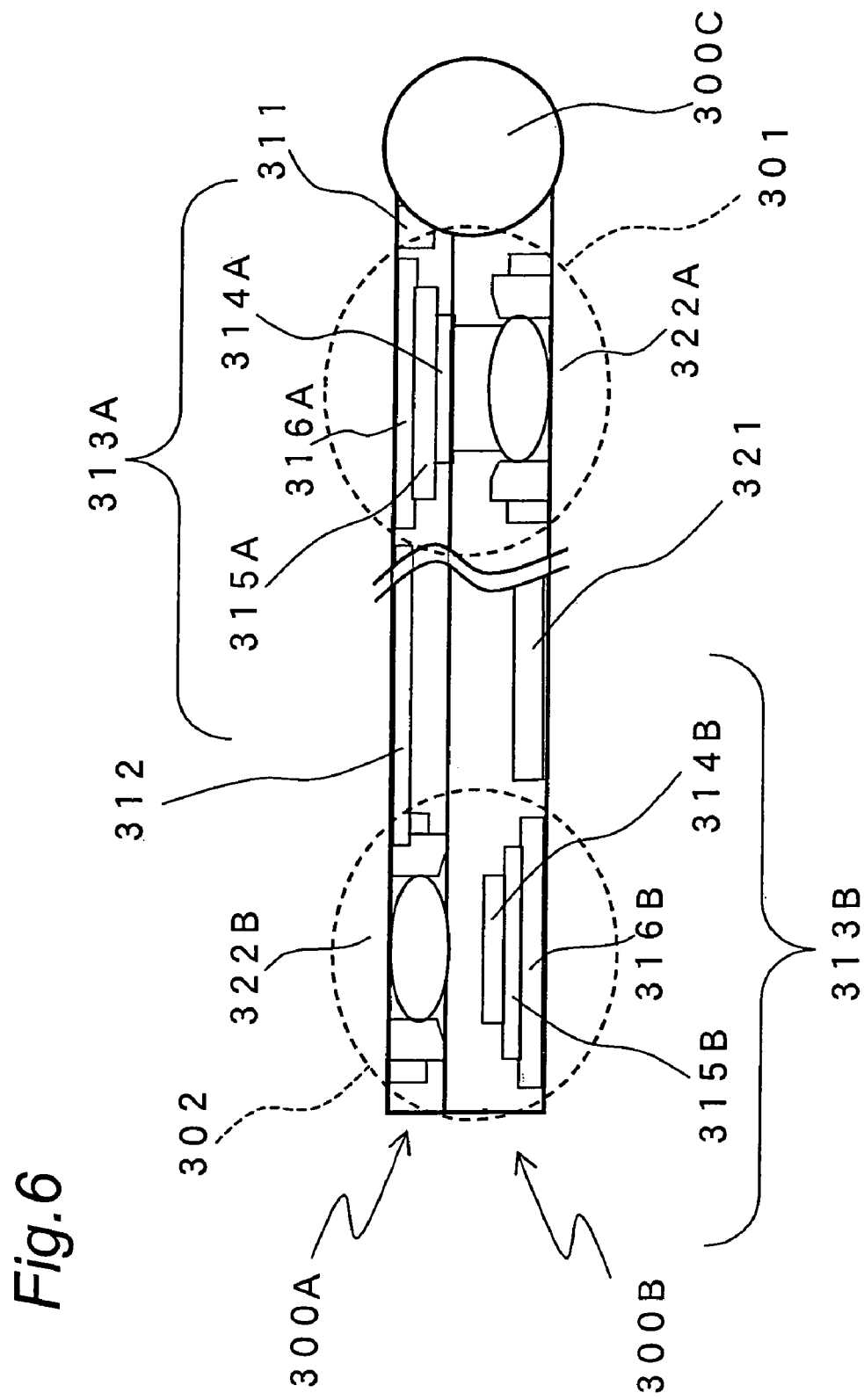
FIG. 6 is a side sectional view of a folding type portable telephone according to a third embodiment of this invention in a state in which the telephone is reversely folded.

FIG. 6 is a side sectional view of the folding type portable telephone of the third embodiment of this invention in a state in which the telephone is reversely folded (closed state). The reversely folded state (closed state) means the state in which the telephone is closed with the main LCD and the portable telephone operation section (keypad) facing outward.

This folding type portable telephone is provided with a first casing 300A that has a display section 312 (main LCD) and a camera operation section 311, a second casing 300B that has a portable telephone operation section 321 (keypad) and a connection section 300C that pivotably connects the first casing 300A with the second casing 300B. The first casing 300A is pivotably connected with the second casing 300B via a hinge unit (not shown) provided for the connection section 300C.

Moreover, the display section 312 (main LCD) ordinarily used is arranged on the front surface side of the first casing 300A, a second lens 322B is arranged on the upper side (the side opposite from the connection section 300C) of the display screen of the display section 312, and a first photosensor section 313A is arranged on the lower side (on the connection section 300C side) of the display screen of the display section 312. On the other hand, in the second casing 300B, a first lens section 322A is arranged on the upper side (on the connection section 300C side) of the portable telephone operation section 321, and a second photosensor section 313B is arranged on the lower side (on the side opposite from the connection section 300C) of the portable telephone operation section 321.

The first photosensor section 313A is provided with a first photosensor device 314A and a first image data processing device 315A and functions as a first camera 301 by being integrated with the first lens section 322A. Moreover, the second photosensor section 313B is provided with a second photosensor device 314B and a second image data processing device 315B and functions as a second camera 302 by being integrated with the second lens section 322B. The camera operation section 311 for shutter operation, operation mode setting and so on is provided on the lower side (in the vicinity of the connection section 300C) of the display screen of the display section 312.

The first and second photosensor sections 314A and 314B each receive light from the subject to be photographed and converts the light into an electrical signal. Moreover, the first and second image data processing devices 315A and 315B are the devices for executing image data processing of the captured display image data into image data for display, image data for storage, image data for enlargement and so on.

With regard to the first lens section 322A, light can be transmitted by exposing at least part of the lens surfaces of the first lens section 322A to the front surface side and the back surface side of the second casing 300B. With regard to the second lens section 322B, light can be transmitted by exposing at least part of the lens surfaces of the second lens section 322B to the front surface side and the back surface side of the first casing 300A. Moreover, since light other than the light from the first and second lens sections 322A and 322B must be prevented from entering into the first and second photosensor sections 313A and 313B, the first casing 300A and the second casing 300B are required to be completely closed.

Use modes of the folding type portable telephone of this third embodiment will be described next with reference to FIG. 6.

First of all, the telephone functions as a camera unit by integrating the first photosensor section 313A with the first lens section 322A into one body and functions as a camera unit by integrating the second photosensor section 313B with the second lens section 322B into one body by folding it with the display section 312 (main LCD) located outward. Next, the first lens section 322A is directed to the subject to be photographed with the first camera 301 put in an operating state by manipulating the camera operation section 311. The body is held so that the display section 312 (main LCD) is located on this side. In the case where the capturing image displayed in the display section 312 (main LCD) is the desired image, the camera operation section 311 provided on the back surface side of the first casing 300A is manipulated to capture the image. This means that the image is captured by using the first camera 301. Then, the captured image data is stored into a nonvolatile memory section (not shown) provided in the portable telephone.

Likewise, the second lens section 322B is directed to the subject to be photographed (on this side this time) with the second camera 302 put in the operating state by the camera operation section 311. In the case where the capturing image displayed in the display section 312 (main LCD) is the desired image, the camera operation section 311 provided on the back surface side of the first casing 300A is manipulated to capture the image. This means that the image is captured by using the second camera 302.

The first and second lens sections 322A and 322B have the structures to be housed in the second casing 300B and the first casing 300A, respectively, and the thickness of the first and second lens sections 322A and 322B is not greater than the original thickness of the casing sections. Therefore, the thickness of the first lens section 322A falls within the thickness of the second casing 300B, while the thickness of the second lens section 322B falls within the thickness of the first casing 300A. Therefore, the thickness of the casing sections can be reduced in comparison with the thickness of each of the folding type portable telephones shown in FIGS. 8 and 9. In short, there is an effect that the portable telephone can be further reduced in thickness with the mounted cameras that are directed in two different directions.

Moreover, by putting the first casing 300A and the second casing 300B into the reversely folded state so that the side opposite from the display screen side of the first casing 300A and the side opposite from the operation panel side of the second casing 300B face each other, it becomes possible to easily confirm the image of the subject to be photographed on the display screen of the display section 312 during the use of the first camera 301.

Moreover, it is also possible to provide first and second lens attaching and detaching means for allowing the lenses to be easily attached and detached for the first and second lens sections 322A and 322B. Otherwise, it is also possible to provide a mechanism as one example of lens selecting means capable of changing the camera performance by sliding only the first and second lens sections 322A and 322B. In this case, it is possible to provide lenses for various applications of photographing such as telephotographing and close-up photographing, and therefore, the range of photographing can be expanded.

Moreover, although the telephone has conventionally been required to be used as a camera unit in the obtusely-angled or bent state (incompletely closed state), the telephone of this invention can be used as a camera unit in the folded state (unused state). As a result, the position of the hand that is holding the main body and the position of the camera come closer to each other than in the conventional obtusely-angled dogleg-like open state, so that blurring at the time of photographing can be reduced. Furthermore, because of the folded state, further compacting than in the conventional case can be achieved, and the photographing operation can be performed even with one hand. Although the camera operation section 311 is provided on the lower side (in the vicinity of the connection section 300C) of the display screen in this third embodiment, it is acceptable to utilize a touch panel type switch on the surface of the display section 312 as a camera operation section. In this case, there is an effect that the parts count can be reduced and the operation panel is smoothed.

Furthermore, it is acceptable to provide the camera operation section 311 at a lower side end portion (on the side surface in the vicinity of the connection section 300C) of the first casing or the second casing. In this case, photographing with one hand becomes easier.

Moreover, the first photosensor section 313A is arranged superposed on the first lens section 322A so that the optical axes thereof roughly coincide with each other to integrally constitute a camera unit. The second photosensor section 313B is arranged superposed on the second lens section 322B so that the optical axes thereof roughly coincide with each other to integrally constitute a camera unit. By thus combining the photosensor section with the lens section and making the respective optical axes coincide with each other, a focused image can be captured.

In this third embodiment, the first photosensor device 313A is constituted by providing the first photosensor device 314A and the first image data processing device 315A on the first mounting board 316A, while the second photosensor section 313B is constituted by providing the second photosensor device 314B and the second image data processing device 315B on the second mounting board 316B. It is apparent that the portable telephone can be further reduced in thickness in the case where the photosensor device and the image data processing device are integrated into one chip in the form of a CMOS image sensor or in the case where the photosensor device and the image data processing device are integrated into one device by the chip stack technology.

(Fourth Embodiment)

Figure 7:
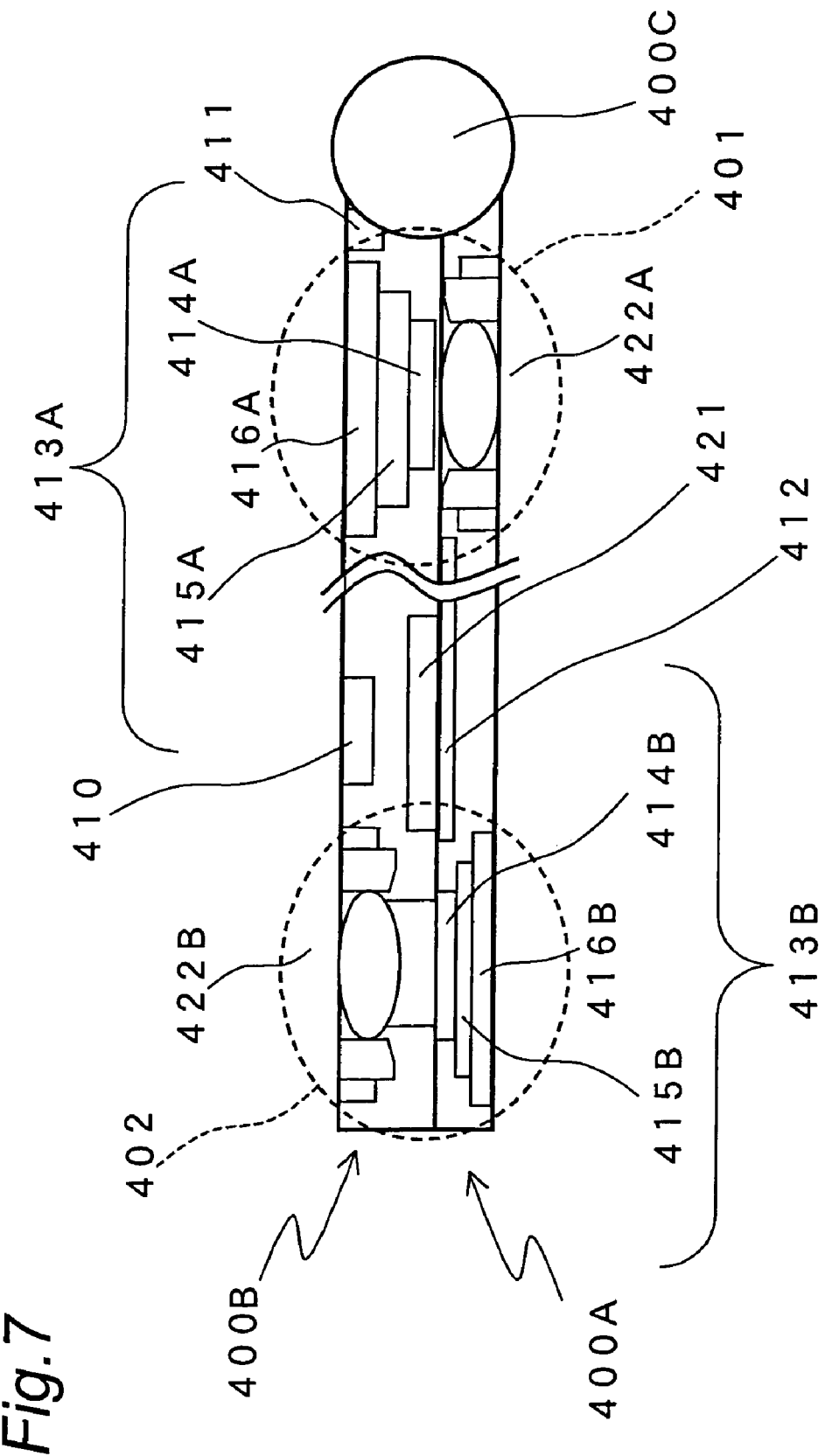
FIG. 7 is a side sectional view of a folding type portable telephone according to a fourth embodiment of this invention in a state in which the telephone is folded up.

FIG. 7 is a side sectional view of the folding type portable telephone of the fourth embodiment of this invention in a state in which the telephone is forwardly folded together (closed state). The forwardly folded state (closed state) indicates a state in which the telephone is closed with the main LCD and portable telephone operation section (keypad) located inside. It is usually the case where the telephone is put in the forwardly folded state (closed state) except for use in telephone conversation. In the folding type portable telephone of this fourth embodiment, a sub-display section 410 constructed of an LCD (sub-LCD), an organic EL or the like is arranged on the front surface side of the second casing 400B, and the sub-LCD is utilized for photographing when the camera is used.

This folding type portable telephone is provided with a first casing 400A that has a main display section 412, a second casing 400B that has a camera operation section 411 and a portable telephone operation section 421 (keypad) and a connection section 400C that pivotably connects the first casing 400A with the second casing 400B. The second casing 400B is pivotably connected to the first casing 400A via a hinge unit (not shown) provided for the connection section 400C.

Moreover, a sub-display section 410 is arranged on the front surface side of the second casing 400B, a second lens section 422B is arranged on the upper side (the side opposite from the connection section 400C) of the display screen of the sub-display section 410, and a first photosensor section 413A is arranged on the lower side (the connection section 400C side) of the sub-display section 410. On the other hand, in the first casing 400A, a first lens section 422A is arranged on the lower side (the connection section 400C side) of the main display section 412, and a second photosensor section 413B is arranged on the upper side (the side opposite from the connection section 400C) of the main display section 412.

The first photosensor section 413A is provided with a first photosensor device 414A and a first image data processing device 415A and functions as a first camera 301 by being integrated with the first lens section 422A described later. Moreover, the second lens section 422B is provided with a second photosensor section 414B and a second image data processing device 415B and functions as a second camera 302 by being integrated with the second photosensor section 413B. A camera operation section 411 for shutter operation, operation mode setting and so on is arranged on the lower side (in the vicinity of the connection section 400C) of the display screen of the sub-display section 410.

The first and second photosensor devices 414A and 414B receive light emitted from the subject to be photographed and convert the light into an electrical signal. Moreover, the first and second image data processing devices 415A and 415B are the devices for processing the captured image data into image data for display, image data for storage, image data for enlargement and so on.

Moreover, light can be transmitted by exposing at least part of the lens surfaces of the first lens section 422A to the front surface side and the back surface side of the first casing section 400A. Light can be transmitted by exposing at least part of the lens surfaces of the second lens section 422B to the front surface side and the back surface side of the second casing section 400B. Moreover, since light other than the light from the lens must be prevented from entering into the second photosensor section 413B, the first casing 400A and the second casing 400B are required to be completely closed.

Moreover, the first photosensor section 413A is arranged superposed on the first lens section 422A so that the optical axes thereof roughly coincide with each other to integrally constitute a camera unit. The second photosensor section 413B is arranged superposed on the second lens section 422B so that the optical axes thereof roughly coincide with each other to integrally constitute a camera unit. By thus combining the photosensor section with the lens section and making the respective optical axes coincide with each other, a focused image can be captured.

In this fourth embodiment, the first photosensor device 413A is constituted by providing the first photosensor device 414A and the first image data processing device 415A on the first mounting board 416A, while the second photosensor section 413B is constituted by providing the second photosensor device 414B and the second image data processing device 415B on the second mounting board 416B. It is apparent that the portable telephone can be further reduced in thickness in the case where the photosensor device and the image data processing device are integrated into one chip in the form of a CMOS image sensor or in the case where the photosensor device and the image data processing device are integrated into one device by the chip stack technology.

Moreover, it is also possible to provide first and second lens attaching and detaching means for allowing the lens to be easily attached and detached for the first and second lens sections 422A and 422B. Otherwise, it is also possible to provide a mechanism as one example of lens selecting means capable of changing the camera performance by sliding only the first and second lens sections 422A and 422B. In this case, it is possible to provide lenses for various applications of photographing such as telephotographing and close-up photographing, and therefore, the range of photographing can be expanded.

Moreover, even if the first casing 400A and the second casing 400B are folded together so that the display screen side of the first casing 400A and the operation panel side of the second casing 400B face each other, the image of the subject to be photographed can be confirmed by the sub-display section 410.

Although the folding type portable telephones equipped with the two cameras that are directed in two different directions have been described in connection with the third and fourth embodiments, it is acceptable to direct the two cameras in same direction to allow, for example, a stereoscopic image or the like to be photographed.

The above description has been based on the case where the folding type camera device of this invention is applied to a folding type portable telephone. However, the objective device is allowed to be any folding type portable device, and the folding type camera device of this invention can be applied to a wide variety of fields of folding type portable game machines, electronic dictionaries, palm type personal computers and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A folding type camera device comprising:
a first casing having a display section side, a back surface side, and a photosensor section for capturing an image;
a second casing having an operational panel side, a back surface side, and a lens section for projecting the image of a subject on the photosensor section of the first casing; and
a connection section for pivotably connecting the first casing with the second casing and allowing the mutually connected first casing and second casing to be folded together so that the back surface side of the first casing is in registration with the back surface side of the second casing.

2. The folding type camera device as claimed in claim 1, wherein
the photosensor section and the lens section are superposed on each other so that the image of the subject is projected on the photosensor section via the lens section in a state in which the first casing and the second casing, which are connected with each other by the connection section, are folded together.

3. The folding type camera device as claimed in claim 2, wherein
optical axes of the lens section and the photosensor section, which are superposed on each other in the folded state, roughly coincide with each other.

4. The folding type camera device as claimed in claim 1, wherein
the lens section has a lens and a lens attaching and detaching means for allowing the lens to be attached and detached.

5. The folding type camera device as claimed in claim 1, wherein
a plurality of the lens sections are provided, and a lens selecting means for selecting one or two or more of the plurality of lens sections is provided.

6. A folding type portable telephone having a first casing located on a display side and a second casing located on an operation panel side, the casings being foldably connected with each other, wherein
either one of the first casing and the second casing has a photosensor section for capturing an image, and
a lens section for projecting an image of a subject on the photosensor section is provided for the other one of the first casing and the second casing.
wherein the photosensor section and lens section are superposed on each other so that the image of the subject is projected on the photosensor section via the lens section in a state in which the first casing and the second casing are folded so that a side opposite from a display screen side of the first casing and a side opposite from an operation panel side of the second casing face each other.

7. The folding type portable telephone as claimed in claim 6, wherein
the photosensor section is provided for the first casing, and
the lens section is provided for the second casing.

8. The folding type portable telephone as claimed in claim 6, wherein
optical axes of the lens section and the photosensor section, which are superposed on each other in the folded state, roughly coincide with each other.

9. The folding type portable telephone as claimed in claim 6, wherein
the lens section has a lens and a lens attaching and detaching means for allowing the lens to be attached and detached.

10. The folding type portable telephone as claimed in claim 6, wherein
a plurality of the lens sections are provided, and a lens selecting means for selecting one or two or more of the plurality of lens sections is provided.

11. The folding type camera device as claimed in claim 6, wherein
the photosensor section and the lens section are superposed on each other so that the image of the subject is projected on the photosensor section via the lens section in a state in which the first casing and the second casing are folded together so that a display screen side of the first casing and an operation panel side of the second casing face each other.

12. The folding type camera device as claimed in claim 11, further comprising:
a sub-display section which is provided on a side opposite from a light-receiving side of the photosensor section of the first casing or the second casing, the casing having the photosensor section, and displays at least the image of the subject captured by the photosensor section.

13. A folding type portable telephone having a first casing located on a display side and a second casing located on an operation panel side, the casings being foldably connected with each other, wherein
either one of the first casing and the second casing has a first photosensor section for capturing an image,
the other one of the first casing and the second casing has a second photosensor section for capturing an image,
either one of the first casing and the second casing has a second lens section for projecting an image of a subject on the second photosensor section, and
the other one of the first casing and the second casing has a first lens section for projecting an image of a subject on the first photosensor section.

14. The folding type portable telephone as claimed in claim 13, wherein
the first photosensor section and the first lens section are superposed on each other so that the image of the subject is projected on the first photosensor section via the first lens section while the second photosensor section and the second lens section are superposed on each other so that the image of the subject is projected on the second photosensor section via the second lens section in a state in which the first casing and the second casing are folded together so that a side opposite from a display screen side of the first casing and a side opposite from an operation panel side of the second casing face each other.

15. The folding type portable telephone as claimed in claim 14, wherein
optical axes of the first lens section and the first photosensor section, which are superposed on each other in the folded state, roughly coincide with each other, and optical axes of the second lens section and the second photosensor section, which are superposed on each other in the folded state, roughly coincide with each other.

16. The folding type portable telephone as claimed in claim 13, wherein
the first lens section has a first lens and a first lens attaching and detaching means for allowing the first lens to be attached and detached, and
the second lens section has a second lens and a second lens attaching and detaching means for allowing the second lens to be attached and detached.

17. The folding type portable telephone as claimed in claim 13, wherein
the first photosensor section and the first lens section are superposed on each other so that the image of the subject is projected on the first photosensor section via the first lens section while the second photosensor section and the second lens section are superposed on each other so that the image of the subject is projected on the second photosensor section via the second lens section in a state in which the first casing and the second casing are folded together so that a display screen side of the first casing and an operation panel side of the second casing face each other.

18. The folding type portable telephone as claimed in claim 17, further comprising:
a sub-display section which is provided on a side opposite from a light-receiving surface of the casing of the first photosensor section or the second photosensor section and displays at least the image of the subject to be captured by the first photosensor section or the second photosensor section.

19. The folding type portable telephone as claimed in claim 17, wherein
optical axes of the first lens section and the first photosensor section, which are superposed on each other in the folded state, roughly coincide with each other, and optical axes of the second lens section and the second photosensor section, which are superposed on each other in the folded state, roughly coincide with each other.

* * * * *